United States Patent
Rausch

(10) Patent No.: US 10,576,931 B2
(45) Date of Patent: Mar. 3, 2020

(54) SENSOR-CONTROLLED KEY SYSTEM FOR A MOTOR VEHICLE AND METHOD FOR THE ENERGY-SAVING ENVIRONMENT MONITORING OF A MOTOR VEHICLE

(71) Applicant: Dr. Ing. h.c. F. Porsche Aktiengesellschaft, Stuttgart (DE)

(72) Inventor: Christoph Rausch, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/133,722

(22) Filed: Sep. 18, 2018

(65) Prior Publication Data
US 2019/0118770 A1    Apr. 25, 2019

(30) Foreign Application Priority Data
Oct. 19, 2017   (DE) .................... 10 2017 124 446

(51) Int. Cl.
*B60R 25/31* (2013.01)
*B60R 25/24* (2013.01)
(Continued)

(52) U.S. Cl.
CPC ............. *B60R 25/24* (2013.01); *B60Q 1/00* (2013.01); *B60R 25/01* (2013.01);
(Continued)

(58) Field of Classification Search
CPC ......... B60R 25/24; G01S 17/10; G01S 17/36; G01S 17/42; G01S 17/936; G05D 1/0238; B60Q 1/085; B60Q 1/143; B60Q 2300/47; B60W 50/0098; F21K 9/238; F21S 41/645; H02J 13/0017; H02J 7/34; H02J 9/02; H04L 67/10; H04L 67/12; H04L 67/125; H04L 67/22; H04L 67/2804; H04N 5/23296; H04N 5/247; H04N 5/76; H04W 4/90; Y02B 10/72; Y02B 20/348; Y02B 20/42; Y02B 20/44; Y02B 70/3216; Y02B 70/3283; Y02B 90/2607; Y04S 20/221; Y04S 20/246; Y04S 40/12;
(Continued)

(56) References Cited

U.S. PATENT DOCUMENTS

| 7,876,645 | B2 * | 1/2011 | Bigliardi | G01S 15/526 367/100 |
| 2015/0262436 | A1 * | 9/2015 | Herthan | B60R 25/2054 340/5.72 |

(Continued)

FOREIGN PATENT DOCUMENTS

DE    102012017393 A1    3/2014

*Primary Examiner* — Dionne Pendleton
(74) *Attorney, Agent, or Firm* — Leydig, Voit & Mayer, Ltd.

(57) ABSTRACT

A sensor-controlled key system for a motor vehicle for releasing an access authorization and for actuating auxiliary functions includes a control device having an electronic key device. The key system further includes at least one optical sensor device with at least one optical sensor element. The optical sensor element has a beam path that defines at least two observation regions B1, B2, Bn. The control device has a switching function that switches observation regions B1, B2, Bn on and off in dependence on a verified or non-verified access authorization.

6 Claims, 2 Drawing Sheets

(51) Int. Cl.
*B60R 25/01* (2013.01)
*B60Q 1/00* (2006.01)
*G08B 13/18* (2006.01)
*B60W 50/00* (2006.01)
*G08B 13/196* (2006.01)

(52) U.S. Cl.
CPC ......... *B60W 50/0098* (2013.01); *G08B 13/18* (2013.01); *G08B 13/1963* (2013.01); *B60Q 2300/45* (2013.01)

(58) Field of Classification Search
CPC ............ Y10T 307/359; H05B 37/0227; H05B 37/0281; H05B 33/0854; H05B 33/0857; H05B 33/0872; H05B 37/0218; H05B 37/0272; G08B 13/1627; G08B 13/193; G08B 13/196; G08B 13/1963; G08B 13/19656; G08B 13/19669; G08B 13/19671; G08B 13/2491; G08B 13/2494; G08B 25/016; G08B 27/00
See application file for complete search history.

(56) References Cited

U.S. PATENT DOCUMENTS

| | | | |
|---|---|---|---|
| 2017/0223807 A1* | 8/2017 | Recker | H05B 37/0272 |
| 2018/0075720 A1* | 3/2018 | Davies | H04W 4/90 |
| 2018/0132340 A1* | 5/2018 | Correa | H05B 37/0281 |
| 2019/0251813 A1* | 8/2019 | Chen | G08B 13/1627 |

* cited by examiner

SENSOR-CONTROLLED KEY SYSTEM FOR A MOTOR VEHICLE AND METHOD FOR THE ENERGY-SAVING ENVIRONMENT MONITORING OF A MOTOR VEHICLE

CROSS REFERENCE TO RELATED APPLICATIONS

This application claims benefit to German Patent Application No. DE 10 2017 124 446.8, filed Oct. 19, 2017, which is hereby incorporated by reference herein.

FIELD

The invention relates to a sensor-controlled key system for a motor vehicle for releasing an access authorization and for actuating auxiliary functions, such as opening/closing doors or tailgates, activating headlamps or spot headlamps etc., having a control device, having an electronic key device and having at least one optical sensor device with at least one optical sensor element. The invention likewise relates to a method for the energy-saving environment monitoring of a motor vehicle using such a sensor-controlled key system.

BACKGROUND

Sensor-controlled key systems for motor vehicles are nowadays well known from the prior art. Such key systems have an electronic key device, which includes, in addition to a control device that is connected to the controlling components, substantially an ID provider, antennas and sensors for identifying the ID provider. Such an electronic key device is also referred to as keyless access system. Moreover, further sensor devices are also constituent parts of such a key system, wherein said further sensor devices relate to convenience functions, such as contactlessly opening a luggage compartment lid or adjusting spot headlamps. An arrangement of said type is known for example from DE 10 2012 017 393 A1. One disadvantage of such a key system is that a great amount of energy is required to make available additional convenience devices for the user for as long as possible. However, the system must be able to distinguish at the same time whether a verified user is located within the region of the motor vehicle and attempts to use the convenience function, or whether a non-verified user is triggering motion sensors, such as e.g. a child playing in the vehicle's environment.

SUMMARY

In an embodiment, the present invention provides a sensor-controlled key system for a motor vehicle for releasing an access authorization and for actuating auxiliary functions. The sensor-controlled key system includes a control device having an electronic key device; and at least one optical sensor device with at least one optical sensor element. The optical sensor element has a beam path that defines at least two observation regions B1, B2, Bn. The control device has a switching function that switches observation regions B1, B2, Bn on and off in dependence on a verified or non-verified access authorization.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention to provide a simple and inexpensive manner of reducing energy required to make available convenience devices for a user.

Embodiments of the invention provide key systems in which an optical sensor element has a beam path that defines at least the observation regions $B_1$, $B_2$, $B_n$, wherein the control device has a switching function which switches observation regions on and off in dependence on a verified or non-verified access authorization. Hereby, the energy consumption and consequently the load on the on-board electrical system can be significantly reduced.

In a particularly advantageous embodiment, an activation time $t_{akt}$ is stored in the control device, wherein, after the activation time $t_{akt}$ has elapsed, a complete deactivation of the at least one sensor device takes place.

It is also advantageous if a counting device with counting values $0-n_{Max}$ is provided, wherein the deactivation of a specific zone region $B_1$, $B_2$, $B_n$ is assigned to in each case one deactivation counting value $N_{nAZ}$. It is here in particular advantageous if the deactivation counting value $N_{nAZ}$ is below a threshold counting value $N_{nSZ}$.

Embodiments of the invention provide methods for energy-saving environment monitoring of a motor vehicle using a sensor-controlled key system, wherein first, all observation regions $B_1$, $B_2$, $B_n$ are captured by the at least one optical sensor element, wherein, after a predetermined time interval $t_{Absn}$, a check is performed as to whether any movement is detected in the outermost activated observation region, wherein, in the case of detected movement and non-valid access authorization, the outermost activated observation region is deactivated by the switching function of the electronic key device and, in the case of non-detected movement, the next outermost observation region is activated, wherein, after checking the nearest observation region $B_1$ and detected movement with non-verified access authorization, a complete deactivation of the at least one sensor device is effected.

After an activation time $t_{akt}$ and non-verified access authorization, a complete deactivation of the at least one sensor device can advantageously likewise be performed.

Moreover, in a particularly advantageous method, a counting device may be provided, wherein the deactivation of a specific observation region $B_1$, $B_2$, $B_n$ is assigned to in each case one deactivation counting value $N_{nAZ}$. It can be in particular advantageous here that the deactivation counting value $N_{nAZ}$ is provided below a threshold counting value $N_{nSZ}$, which is assigned to a respective boundary between two observation regions $B_1$, $B_2$, $B_n$ such that, after a complete deactivation, the last-activated, outermost observation region $B_1$, $B_2$, $B_n$ is reactivated.

Figure 1:
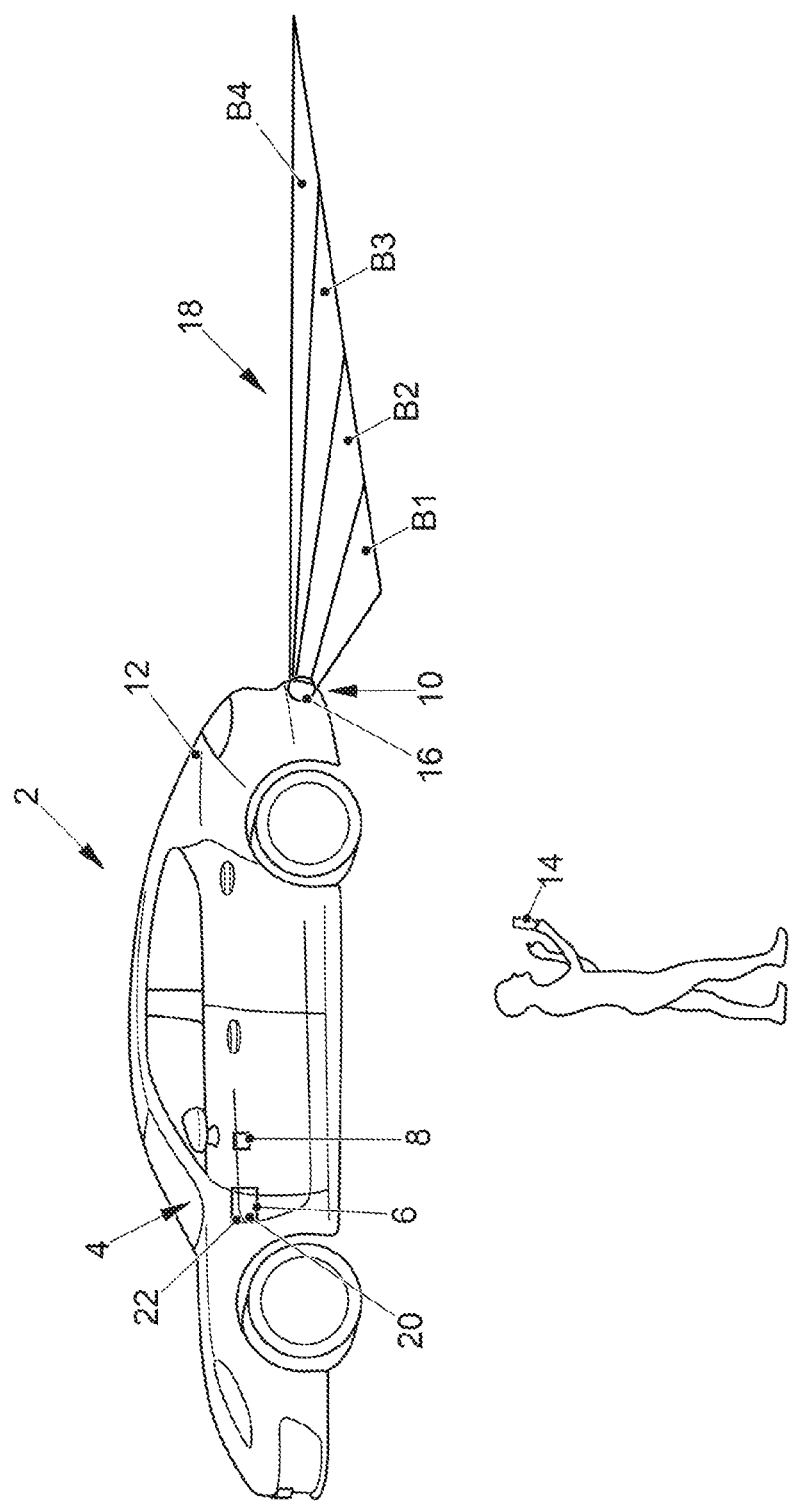
FIG. 1 shows a side view of a motor vehicle having a sensor element for the trunk lid activation and assigned observation regions.

FIG. 1 shows a motor vehicle 2 having a sensor-controlled key system 4 according to an embodiment of the invention. The key system has, in a known manner, a control device 6, an electronic key device 8 and at least one optical sensor device 10 for contactlessly opening a tailgate 12 of the motor vehicle 2. The electronic key device 8 can be designed in any way, i.e. optical, capacitive etc. However, a prerequisite is that a user carries a transmission element 14 on him or her. The optical sensor device 10 in the present exemplary embodiment has exactly one sensor element 16, which can be triggered for example by a foot entering an observation region $B_1$-$B_4$. A beam path 18 of the optical sensor element 16 is consequently fanned out undivided into the observation regions $B_1$, $B_2$, $B_3$ and $B_4$, wherein $B_4$ describes the outermost observation region and $B_1$ describes the observation region nearest the motor vehicle 2. In order to avoid any unnecessary drain on the on-board electrical system and at the same time make available to the user convenience functions, such as the contactless opening of the tailgate 12, for as long as possible, the control device 6 has a switching function 20, which switches the observation regions $B_1$-$B_4$ on and off in dependence on a verified or non-verified access authorization. In addition, an activation time $t_{akt}$ is stored in the control device 6, and, after it has elapsed without a verified access authorization, a complete deactivation of the sensor device 10 is effected. As is explained in more detail in connection with FIG. 2, furthermore provided is a counting device 22, in which counting values from 0–$n_{Max}$ are stored, wherein, at a respective deactivation counting value $N_{nAZ}$, deactivation of a specific zone region $B_1$-$B_4$ takes place. In order to be able to proceed after a complete deactivation of the sensor device 10 in the last-activated observation region, the deactivation counting value $N_{nAZ}$ is below a threshold counting value $N_{nSZ}$.

Figure 2:
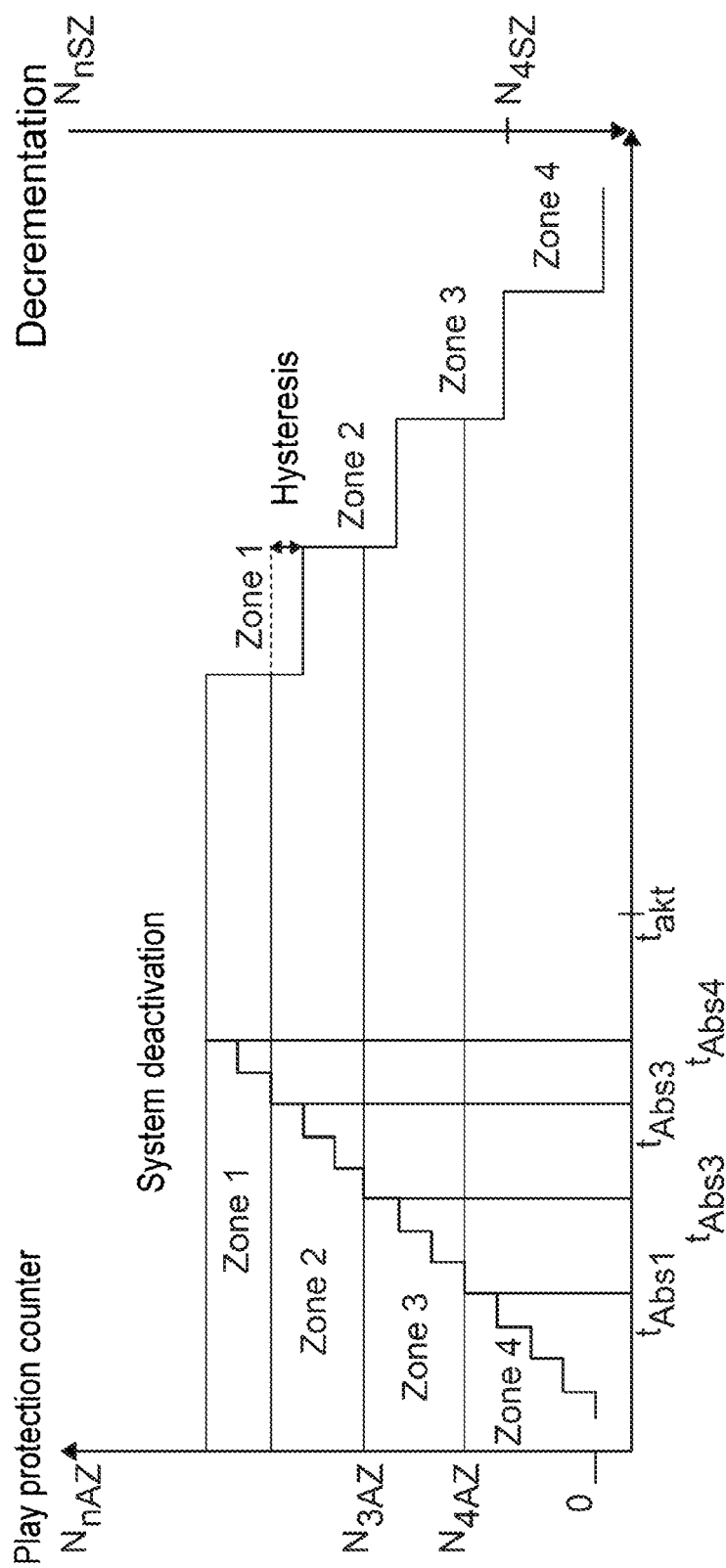
FIG. 2 shows a schematic illustration of a switching function of the sensor-controlled key system from FIG. 1.

On the basis of FIG. 2, the method for the energy-saving environment monitoring of the motor vehicle will now be explained in more detail. As shown in FIG. 1, the beam path 18 of the sensor organ 16 has four observation regions $B_1$, $B_2$, $B_3$ and $B_4$, wherein $B_1$ indicates the nearest observation region and $B_4$ indicates the outermost observation region. It is now to be assumed that the user has just left the vehicle, and it must be ensured that the user can still perform a convenience function, such as contactlessly opening the tailgate 12. For this purpose, the complete beam path 18 with all observation regions $B_1$-$B_4$ of the sensor organ 14 is activated. If in a specific observation region $B_1$-$B_4$ after a predetermined time interval a movement is detected, but access authorization has not been verified, the control device 6 deactivates the relevant observation region due to the switching function 20 and merely leaves the other, remaining observation regions activated. With permanent non-verification and an available movement pattern in the respective observations zones $B_1$, $B_2$, $B_3$ and $B_4$ after the time interval $t_{Abs4}$, this would result, in accordance with FIG. 2, in the complete deactivation of the sensor device 10. Furthermore, the control device has a counting device 22 which stores respective deactivation counting values $N_{nAZ}$. These deactivation counting values are below specific threshold counting values $N_{nSZ}$ with the advantage that it is possible to start the system 4 again in a last-activated zone after a complete deactivation of the sensor device 10. That is to say, if the observation region $B_4$ was deactivated last and the observation region $B_3$ is activated, and if a complete system deactivation is initiated, for example by the user, the system will be activated again with the activated observation region. A complete deactivation of the system 4 can also be caused by the lapse of an activation time $t_{akt}$ without a verified access authorization having been detected.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sensor-controlled key system for a motor vehicle for releasing an access authorization and for actuating auxiliary functions, the sensor-controlled key system comprising:
    a control device having an electronic key device; and at least one optical sensor device with at least one optical sensor element, wherein the optical sensor element has a beam path that defines at least two observation regions $B_1$, $B_n$,
    wherein the control device has a switching function that switches observation regions $B_1$, $B_n$, on and off in dependence on a verified or non-verified access authorization
    wherein a counting device with counting values is provided, wherein the deactivation of a specific zone region $B_1$, $B_n$, is assigned to in each case one deactivation counting value, and
    wherein the deactivation counting value is below a threshold counting value.

2. The sensor-controlled key system as claimed in claim 1, wherein an activation time $t_{akt}$ is stored in the control device, wherein, after the activation time $t_{akt}$ has elapsed, a complete deactivation of the at least one sensor device takes place.

3. A method for the energy-saving environment monitoring of a motor vehicle using a sensor-controlled key system, the method comprising:
    capturing all observation regions $B_1$, $B_n$ by at least one optical sensor element;
    performing, after a predetermined time interval, a check as to whether any movement is detected in an outermost activated observation region;
    if movement is detected with non-valid access authorization, deactivating an outermost activated observation region by a switching function of an electronic key device; and
    if movement is not detected, activating a next outermost observation region, wherein, after checking the nearest observation region $B_1$ and detected movement with non-verified access authorization, a complete deactivation of the at least one sensor device is effected.

4. The method for the energy-saving environment monitoring as claimed in claim 3, wherein, after an activation time and non-verified access authorization, a complete deactivation of the at least one sensor device is performed.

5. The method for the energy-saving environment monitoring as claimed in claim 3, wherein a counting device is provided, wherein deactivation of a specific observation region is assigned to in each case one deactivation counting value.

6. The method for the energy-saving environment monitoring as claimed in claim 5, wherein a deactivation counting value is provided below a threshold counting value assigned to a respective boundary between two observation regions such that, after a complete deactivation, the last-activated, outermost observation region is reactivated.

* * * * *